US009473782B2

(12) United States Patent
Jagannathan et al.

(10) Patent No.: US 9,473,782 B2
(45) Date of Patent: Oct. 18, 2016

(54) LOOP FILTERING MANAGING STORAGE OF FILTERED AND UNFILTERED PIXELS

(71) Applicant: TEXAS INSTRUMENTS INCORPORATED, Dallas, TX (US)

(72) Inventors: Shyam Jagannathan, Bangalore (IN); Naveen Srinivasamurthy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 624 days.

(21) Appl. No.: 13/663,931

(22) Filed: Oct. 30, 2012

(65) Prior Publication Data

US 2013/0114737 A1 May 9, 2013

(30) Foreign Application Priority Data

Nov. 9, 2011 (IN) .......................... 3846/CHE/2011

(51) Int. Cl.
*H04N 7/12* (2006.01)
*H04N 11/02* (2006.01)
*H04N 11/04* (2006.01)
*H04N 19/433* (2014.01)
*H04N 19/43* (2014.01)

(52) U.S. Cl.
CPC ............ *H04N 19/433* (2014.11); *H04N 19/43* (2014.11)

(58) Field of Classification Search
CPC ..................... H04N 7/26888; H04N 7/26058; H04N 7/50
USPC .......................... 348/240.01, 240.02, 240.29
See application file for complete search history.

(56) References Cited

U.S. PATENT DOCUMENTS

2006/0008013 A1* 1/2006 Pelc et al. ................ 375/240.29
2006/0115002 A1* 6/2006 Kim et al. ................ 375/240.29
2010/0284464 A1 11/2010 Nagori et al.
2011/0317762 A1 12/2011 Sankaran

* cited by examiner

*Primary Examiner* — Chikaodili E Anyikire
(74) *Attorney, Agent, or Firm* — Robert D. Marshall, Jr.; Frank D. Cimino

(57) ABSTRACT

A video encoder comprises a loop filter to filter luminance and chrominance pixel values, first and second loop filter working buffers accessible to the loop filter, and ping and pong loop filter data buffers accessible to the loop filter and to a direct memory access (DMA) engine. The loop filter filters pixels about a plurality of vertical edges and a plurality of horizontal edges for each macroblock in a video frame. The loop filter distributes partially filtered luma and chrominance pixel values across the first and second loop filter working buffers as well as the ping and pong loop filter data buffers, and does not save partially filtered luma and chrominance pixel values to external memory via the DMA engine.

6 Claims, 6 Drawing Sheets

LOOP FILTERING MANAGING STORAGE OF FILTERED AND UNFILTERED PIXELS

CROSS-REFERENCE TO RELATED APPLICATION

The present application claims priority to India Provisional Patent Application No. 3846/CHE/2011, filed on Nov. 9, 201, which is incorporated herein by reference.

BACKGROUND

High definition (HD) video comprises numerous macroblocks per frame. For 1080p video, there are 8160 16×16 pixel macroblocks. Thus 8160 macroblocks must be decoded 30 times per second, thereby imposing a significant performance burden on the encoder. Video encoders often are constructed in a pipeline fashion to improve throughput, but additional performance improvements may be desirable.

SUMMARY

The problems noted above are solved in large part by a video encoder that comprises a loop filter to filter luminance (luma) and chrominance (chroma) pixel values. first and second loop filter working buffers accessible to the loop filter, and ping and pong loop filter data buffers accessible to the loop filter and to a direct memory access (DMA) engine. The loop filter filters pixels about a plurality of vertical edges and a plurality of horizontal edges for each macroblock in a video frame. The loop filter distributes partially filtered luma and chrominance pixel values across the first and second loop filter working buffers as well as the ping and pong loop filter data buffers, and does not save partially filtered luma and chroma pixel values to external memory via the DMA engine.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
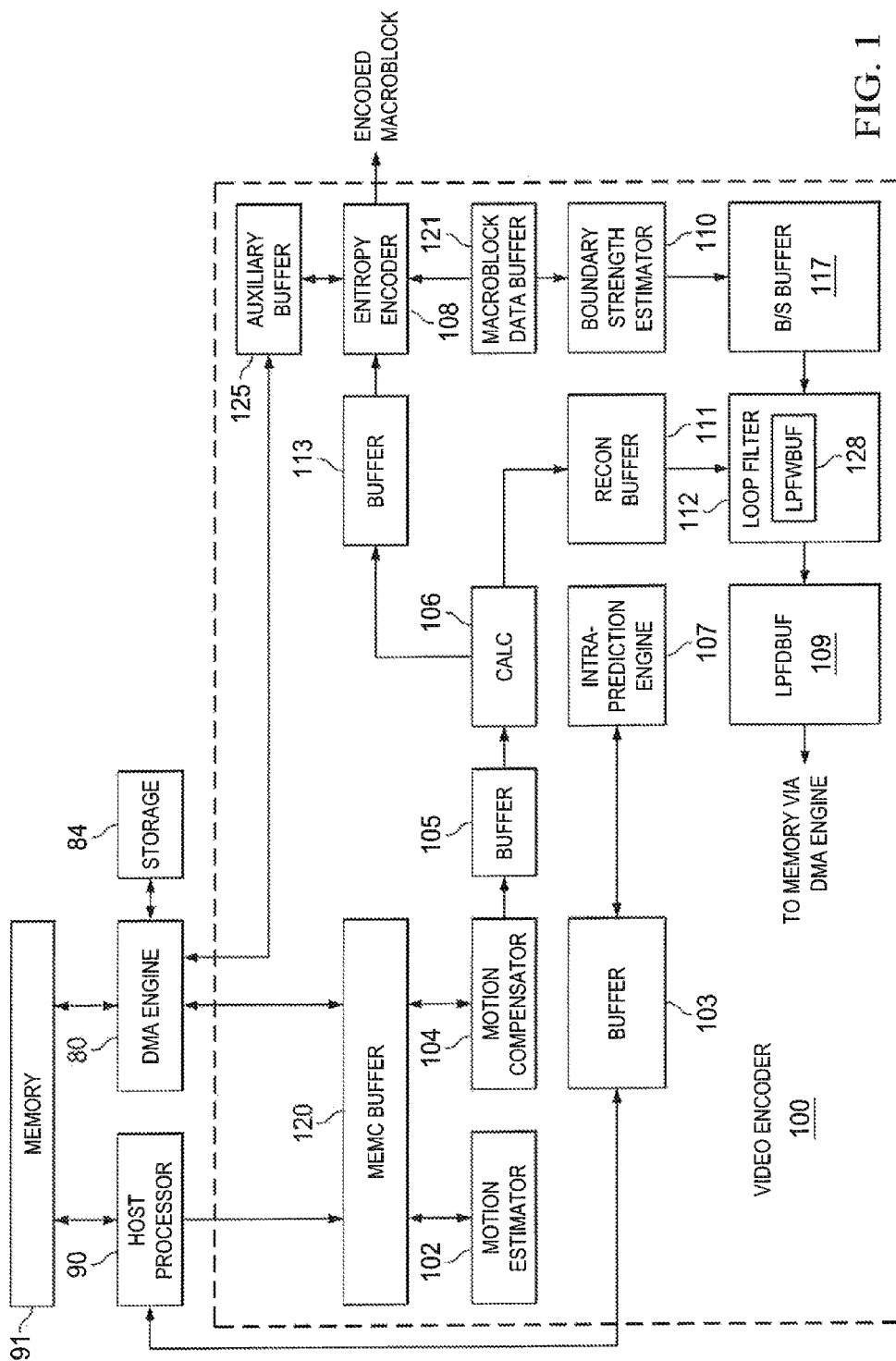
FIG. 1 shows a system including a video encoder in accordance with various embodiments.

FIG. 1 shows a block diagram of a video encoder 100 in accordance with various embodiments. The encoder 100 includes a motion estimator (ME) 102, a motion compensator (MC) 104, a calculation engine (CALC) 106, an intra-prediction engine 107, an entropy encoder 108, a boundary strength estimator 110, and a loop filter 112.

The motion estimator 102 and the motion compensator 104 cooperate to provide macroblock inter-frame predictions (i.e., temporal predictions). The motion estimator 102 searches a previous frame for a matching macroblock to each macroblock in a current frame and generates a motion vector for a given macroblock based on a closest match for the macroblock in a previously encoded frame. The ME 102 writes the motion vector at a common offset in buffer 120 agreed upon by the ME 102 and MC 104. The motion compensator 104 applies the motion vector produced by the motion estimator 102 to the previously encoded frame to generate an estimate of the given macroblock.

The intra-prediction engine 107 analyzes a given macroblock with reference to one or more adjacent macroblocks in the same frame. For example, when encoding a given macroblock, the intra-prediction engine 107 may analyze a macroblock directly above (upper macroblock), a macroblock to the right of the upper macroblock (upper right macroblock), a macroblock to the left of the upper macroblock (upper left macroblock), and a macroblock immediately to the left of the given macroblock (left macroblock) to provide spatial predictions. The intra-prediction engine 107 generates a spatial activity metric which it stores in buffer 103. Based on the analysis, the intra-prediction engine 107 selects one of a plurality of intra-prediction modes for application to the given macroblock.

In addition to the motion vector, the ME 102 generates another metric known as the Sum of Absolute Differences (SAD). The SAD is the sum of the absolute differences between pixels in a current macroblock and corresponding pixels in a reference macroblock. The host processor 90 reads the spatial activity metric generated by the intra-prediction engine 107 via buffer 103 and the SAD generated by the ME 102 and performs a mode decision. In the mode decision, the host processor 90 determines whether the current macroblock is to be encoded using either an intra-block encoding technique or an inter-block encoding technique. After making this mode decision, the host processor 90 programs the CALC engine 106 and the entropy encoder 108 to encode each macroblock in accordance with the mode decision made for the macroblock.

In accordance with at least some embodiments of the invention, the intra mode is fixed at 16×16 (one of the four 16×16 modes per the H.264 standard) so that the intra-prediction engine 107 does not have to spend cycles to decide the mode. Further, the intra-prediction engine 107 preferably is programmed to provide a measure of spatial activity of the current block which is used to compare against a SAD of the motion compensated block.

If the mode decision made by the host processor 90 is to inter-block encode a given macroblock, the CALC engine 106 reads interpolated (or motion compensated luminance and chrominance values from a buffer 105 shared between the MC 104 and CALC engine 106. The CALC engine 106 is given a copy of the current macroblock (also referred as the "original" macroblock) by the host processor 90 using the DMA engine 80. The CALC engine 106 takes the difference between motion compensated pixels and current pixels to produce residuals. The residuals will be transformed, quantized, and saved to a buffer 113 shared between the CALC engine 106 and the entropy encoder 108. As quantization is a lossy process (i.e., the precision of the transformed coefficients will be lost when inverse quantization is applied), the CALC engine will produce a reconstructed set of pixels by performing inverse quantization and inverse transformation. The CALC engine 106 will then save the reconstructed pixels in a reconstruction ("recon") buffer 111 shared between the CALC engine 106 and the loop filer 112. The reconstructed pixels will be filtered by the loop filter 112 based on the boundary strengths provided by the boundary strength estimator 110. The loop filter 112 saves the filtered data to a loop filter data buffer (LPFDBUF) 109 (which is accessible also by the DMA engine 80).

If the mode decision made by the host processor 90 is to intra-block encode a given macroblock, the CALC engine 106 reads the intra mode and performs intra prediction for the mode for which it has been programmed. The CALC engine 106 computes the difference between intra-predicted pixels and current pixels and produces the residuals. The residuals will be transformed, quantized, and saved into buffer 113. As noted above, quantization is a lossy process and thus the CALC engine will produce a reconstructed set of pixels by performing inverse quantization and inverse transformation. The CALC engine 106 will then save the reconstructed pixels into recon buffer 111. The reconstructed pixels will be filtered by the loop filter 112 based on the boundary strengths provided by the boundary strength estimator 110 via boundary strength buffer 117. The loop filter 112 saves the filtered data to LPFDBUF 109 for subsequent transfer by the DMA engine 80 to external memory 91. The filtering process is described in greater detail below.

The entropy encoder 108 receives the transformed quantized residuals, and applies a suitable coding technique. For example, the entropy encoder 108 may apply one of context adaptive binary arithmetic coding and context adaptive variable length coding to produce an entropy encoded macroblock.

The entropy encoder 108 and the boundary strength estimator 110 share and communicate with each other by way of macroblock data buffer (MBDATBUF) 121. The entropy encoder stores a data set in the MBDATBUF 121 that defines a corresponding macroblock. The boundary strength estimator 110 reads the macroblock data set of each macroblock and assigns strength values to the edges of blocks within the macroblock. For example, the boundary strength estimator 110 may apply strength values to the edges of 4×4 or 8×8 blocks of each macroblock. The strength values may be determined based on, for example, inter-block luminance gradient, size of applied quantization step, and difference in applied coding.

The loop filter 112 receives the strength values provided from the boundary strength estimator 110 and filters the block edges in accordance with the boundary strength values. Each filtered macroblock may be stored for use by the motion estimator 102 and the motion compensator 104 in inter-prediction.

Referring still to FIG. 1, the video encoder 100 also includes a buffer 120 that is shared by the motion estimator (ME) 102 and the motion compensator (MC) 104. Because the buffer 120 is shared by ME 102 and MC 104, the buffer is referred to as an MEMC buffer 120. The MEMC buffer 120 is also shared by a DMA engine 80 and/or a host processor 90. The host processor 90 itself may write video data to the MEMC buffer 120 or program the DMA engine 80 to write video data from storage 84 to the buffer. Thus, the MEMC buffer 120 is accessible by multiple other hardware units (e.g., ME 102, MC 104, DMA engine 80, and host processor 90.

Referring still to FIG. 1, the loop filter 112 shares the LPFDBUF 109 with the DMA engine 80. The loop filter 112 has its own dedicated loop filter working buffer (LPFW-BUF) 128. The LPFDBUF 109, the recon buffer 111, and the boundary strength buffer 117 preferably are implemented in a dual buffer, ping-pang configuration. The LPFWBUF 128 dedicated for use by the loop filter 112 may be a dual buffer but preferably is not implemented in a ping-pong configuration.

Figure 2:
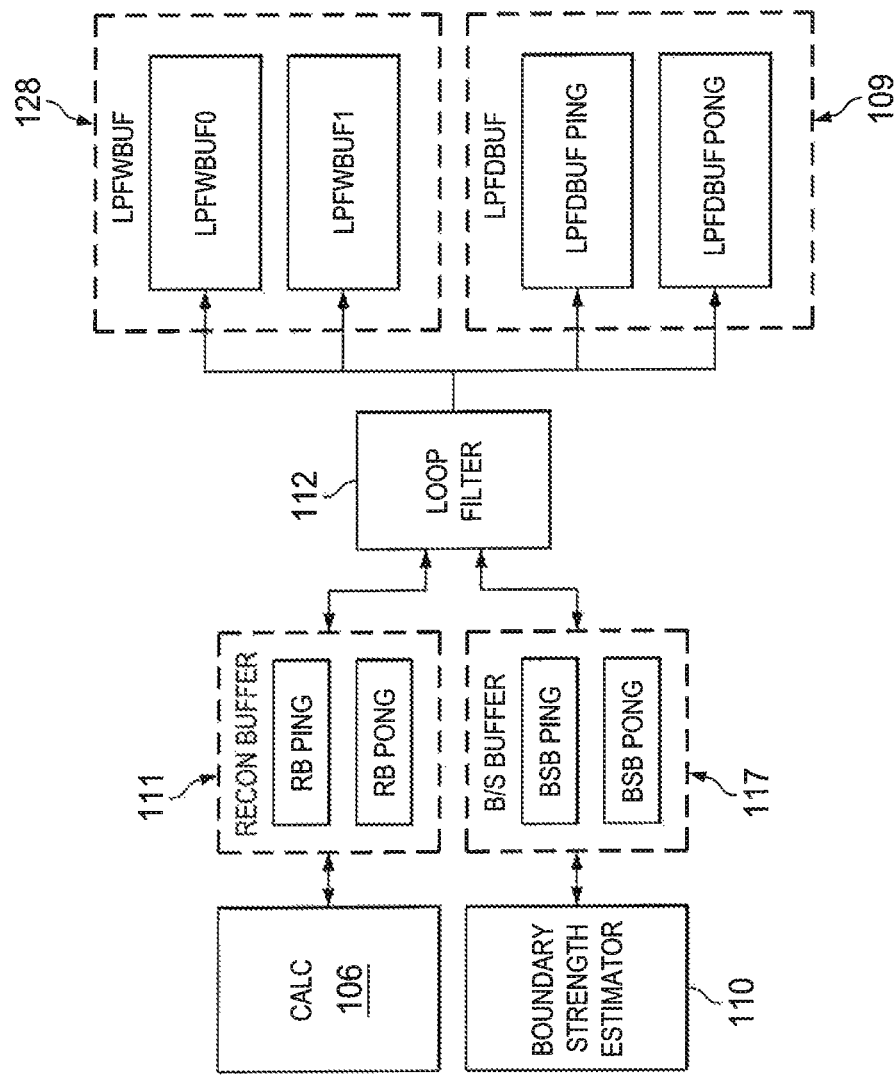
FIG. 2 illustrates a loop filter and associated local buffers in accordance with various embodiments.

FIG. 2 illustrates the CALC engine 106, the boundary strength estimator 110, and the loop filter 121 with the corresponding relevant buffers, namely the recon buffer 111, the boundary strength buffer 117, the LPFDBUF 109, and the LPFWBUF 128. The recon buffer 111 may be implemented as a dual buffer arrangement having buffers recon buffer ping (RB ping) and recon buffer pong (RB pong). Similarly, the boundary strength buffer 117 may be implemented as a dual buffer arrangement having boundary strength buffer ping (BSB ping) and boundary strength buffer pong (BSB pong). LPDBUF 109 includes LPFDBUF ping and LPFDBUF pong.

Figure 3A:
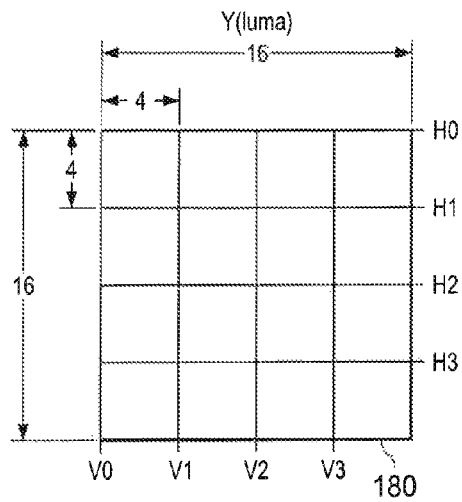
FIGS. 3a-c illustrate a macroblock's luma and chroma pixel values and corresponding edges about which loop filtering of pixel values is performed.
Figure 3B:
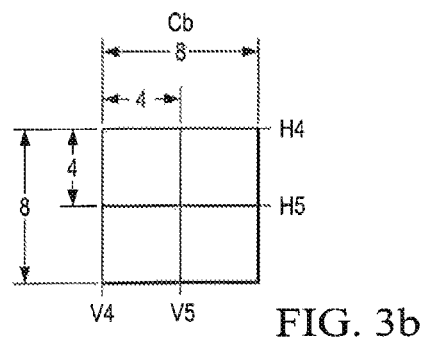
Figure 3C:
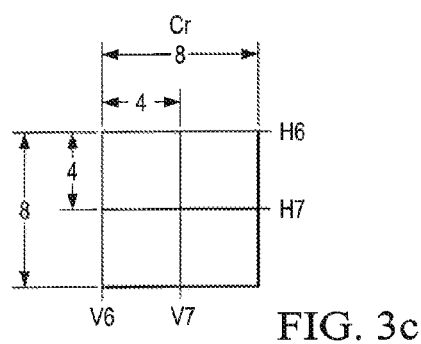

FIG. 3a illustrates a single macroblock (macroblock 180) in terms of luminance (luma) pixel values. The macroblock represents a 16×16 array of pixels. Four horizontal edges H0, H1, H2, and H3 are shown spaced four pixels apart starting at the top row of pixels in the macro. As such, horizontal edge H0 separates macroblock 180 from its top macroblock (not shown). Four vertical edges V0, V1, V2, and V3 also are shown spaced four pixels apart and beginning at the left edge of the macro block. As such, vertical edge V0 separates macroblock 180 from its left macroblock (not shown). Each macroblock has eight edges—four horizontal edges and four vertical edges. FIGS. 3b and 3c represent macroblocks for chrominance (chroma) pixel values (Cb and Cr). For chroma values, each macroblock may have two horizontal edges (H4/H5 and H6/H7) and two vertical edges (V4/V5 and V6/V7).

The loop filter 112 performs both vertical and horizontal filtering about the eight edges. In some embodiments, the loop filter 112 performs a two-stage filtering process. In the first stage, the loop filter 112 performs vertical filtering about the four vertical luma edges V0-V3. In the second stage, the loop filter performs horizontal filtering about the four horizontal luma edges H0-H3. Such filtering is followed by vertical filtering of Cb edges V4, V5 followed by horizontal filtering of Cb edges H4, H5. This is followed by vertical filtering of Cr edges V6, V7 followed by horizontal filtering of Cr edges H6, H7.

Figure 4:
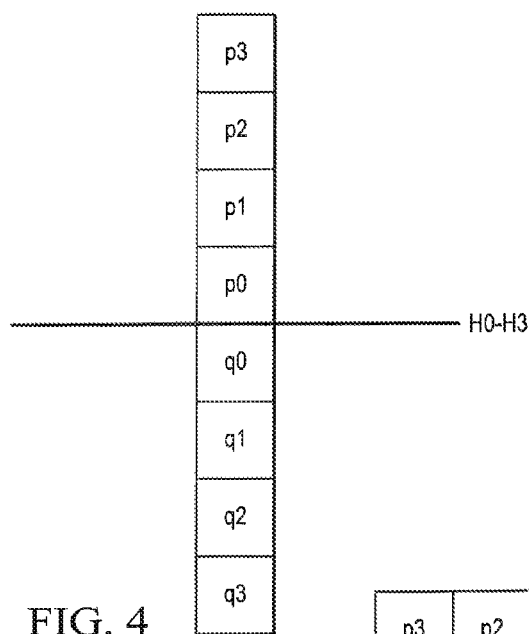
FIGS. 4 and 5 show individual vertical and horizontal edges respectively for performing loop filtering.
Figure 5:
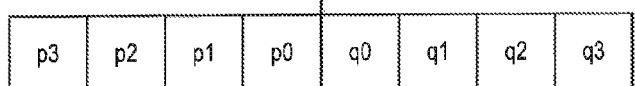

FIG. 4 illustrates a single one of the horizontal lines H0-H3 along with four pixels (p0-p3) above the horizontal line and four pixels (q0-q3) below the line. Similarly, FIG. 5 illustrates a single one of the vertical lines V0-V3 along with four pixels (p0-p3) to the left of the vertical line and four pixels (q0-q3) to the right of the vertical line.

The boundary strength estimator 110 preferably computes boundary strength values across each horizontal and each vertical edge and take into account all eight pixels for each such edge (four pixels on each side of the edge). For example, in FIG. 4, the boundary strength estimator 110 computes a boundary strength value about edge H0 (or H1-H3) based on pixels p0-p3 and q0-q3. Similarly, the boundary strength estimator 110 computes boundary strength values for each vertical edge V0 (or V1-V3) based on pixels p0-p3 and q0-q3. Any of a variety of computations to compute the boundary strength values based on pixels adjacent the edge are possible and within the scope of this disclosure.

The boundary strength values computed by the boundary strength estimator 110 represent filter coefficients used by the loop filter 112. The loop filter 112 preferably multiplies as many as the three pixels immediately adjacent each horizontal or vertical edge by the corresponding filter coefficient. Thus, four pixels on each side of the edge are used to compute the filter coefficient by the boundary strength estimator, but the resulting coefficient is only applied to one, two or three pixels on each side of the edge by the loop filter 112.

Figure 6:
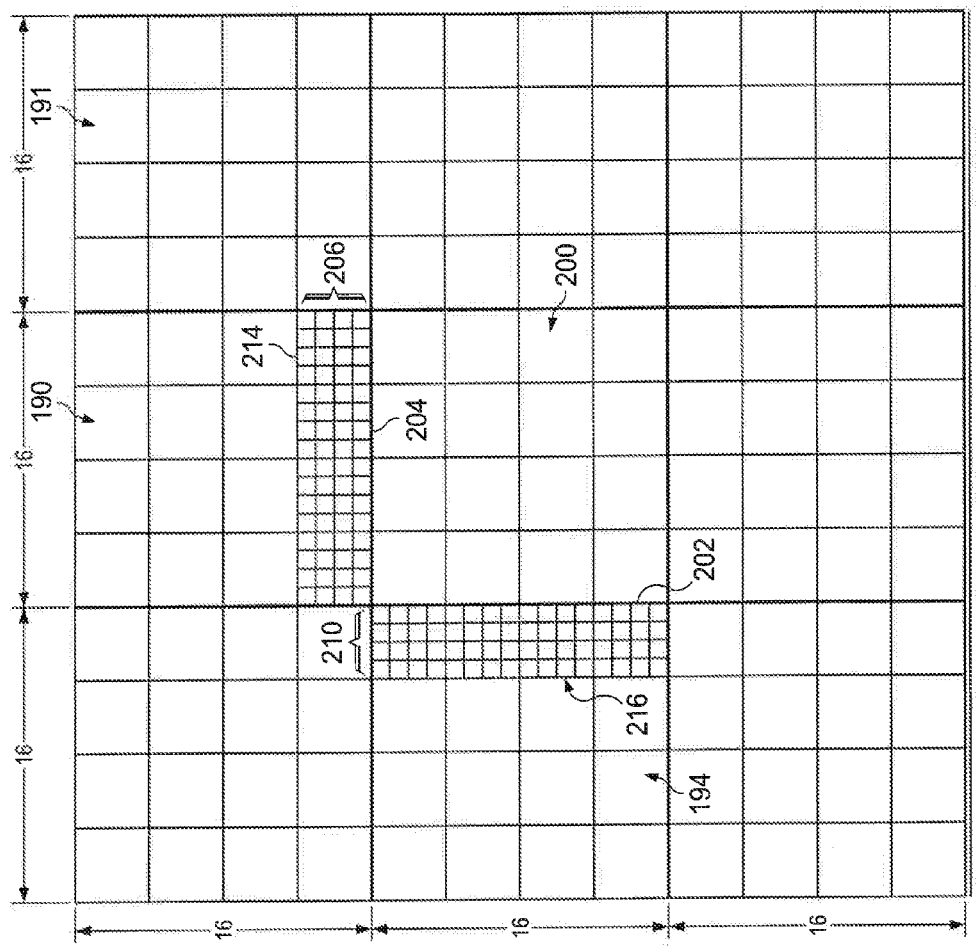
FIG. 6 shows a grid of multiple macroblocks.

FIG. 6 illustrates a video frame (or a portion of a frame) which includes nine macroblocks arranged in a 3×3 array. The center macroblock (second row, second macroblock) is designated as 200. Its top macroblock is designated as 190 and its left macroblock is designated as 194. The top horizontal edge of macroblock 200 is identified as 204 and the left vertical edge of macroblock 200 is identified as 202. Reference numeral 206 refers to the four rows of pixels immediately above top edge 204, and are pixels within the top macroblock 190. Reference numeral 210 refers to the four columns of pixels immediately to the left of left edge 202, and are pixels within the left macroblock 194.

When the loop filter 112 filters the pixels adjacent horizontal edge 204 of the center macroblock 200, at least some of the four rows of pixels 206 are changed. That is, some of the pixels in rows 206 are changed when filtering the top macroblock 190 about its horizontal edge 214, and some of the same pixels are again changed when filtering the center macroblock 200 about top edge 204. Thus, the top macroblock 194 is not fully filtered until at least a portion of the filtering process for the center macroblock 200 completes. A macroblock that has undergone some filtering but for which all filtering is not yet complete is referred to as a partially filtered macroblock. Similarly, pixels that have undergone some filtering but for which all filtering is not yet complete are referred to as a partially filtered pixels.

Similarly, when the loop filter 112 filters the pixels adjacent vertical edge 202 of the center macroblock 200, at least some of the four columns of pixels 210 are changed. That is, some of the pixels in columns rows 210 are changed when filtering the left macroblock 194 about its vertical edge 216, and some of the same pixels are again changed when filtering the center macroblock 200 about its left edge 202.

Thus, the left macroblock 190 is not fully filtered until at least a portion of the filtering process for the center macroblock 200 completes.

The loop filter 212 preferably filters pairs of macroblocks at a time. For example, the loop filter 112 concurrently filters top macroblock 190 and its adjacent right macroblock neighbor 191. However, as explained above, the filtering operation for a given macroblock cannot fully complete until the loop filter 112 begins filtering yet another macroblock. For example, the loop filter 112 may begin filtering macroblocks 190 and 191, but cannot fully complete the filtering of macroblock 190 until the filter begins to filter center macroblock 200. In prior decoder encoder implementations, each partially filtered macroblock was saved to main memory outside the encoder and then brought back into the filter to complete the filtering operation. The large quantity of pixel data was a burden on the bandwidth and the resources of the encoder.

In accordance with the preferred embodiments, video encoder 100 preferably only saves completely filtered pixels to external memory 91 via DMA engine 84. All partially filtered pixels are retained locally in buffers directly accessible to the loop filter. Partially filtered pixels are not stored in memory external to the encoder.

Referring again to FIG. 2, CALC 106 writes each reconstructed macroblock into the recon buffer 111 (e.g., RB ping). The boundary strength estimator 110 computes the boundary strength values and writes the values to the boundary strength buffer 117 (e.g., BSB ping). Then, a buffer switch occurs to permit the loop filter 112 to copy the reconstructed pixels from the RB ping to the LPFWBUF0 buffer and the boundary strength values from the BSB ping buffer to the LPFDBUF0 buffer. While the loop filter is copying the contents of the RB and BS ping buffers, the CALC 106 and boundary strength estimator 110 are writing new reconstructed macroblocks and boundary strength values to the RB and BS pong buffers. And the process repeats with a switch from pong back to ping RB and BSB buffers.

Once the reconstructed macroblock data and the boundary strength values are loaded into the respective LPFWBUF0/1 and LPFDBUF 0/1 buffers, the filtering process begins.

Figure 7:
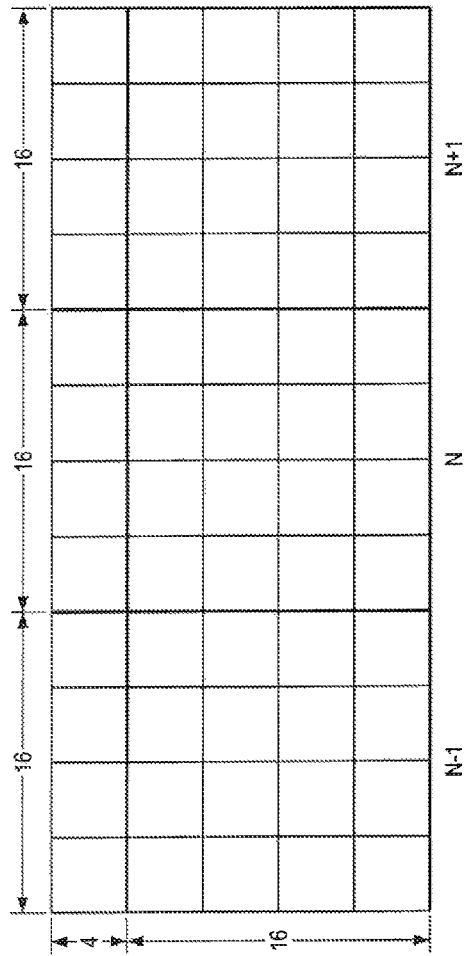
FIGS. 7 and 8 illustrate macroblock grids for loop filtering luma and chroma pixel values.

The encoder 100 preferably filters macroblocks two at a time. Thus filter 112 retrieves pairs of macroblock pixel data for processing concurrently. The two macroblocks are adjacent (i.e., side by side) macroblock pairs. FIG. 7 depicts a grid for luminance ("luma") values. The grid depicts three adjacent macroblocks—macroblock N−1, macroblock N, and macroblock N+1. The loop filter 112 may have already filtered macroblock N−1 and is now filtering the macroblock pair N and N+1.

Each macroblock grid represents an array of 16×16 pixels as noted above. Above each macroblock is shown in FIG. 7 a portion of the macroblock immediately each macroblock. Filtering of luma pixel values is based on the four luma values immediately above a given macroblock (i.e., the bottom four rows of luma values from the top macroblock).

Figure 8:
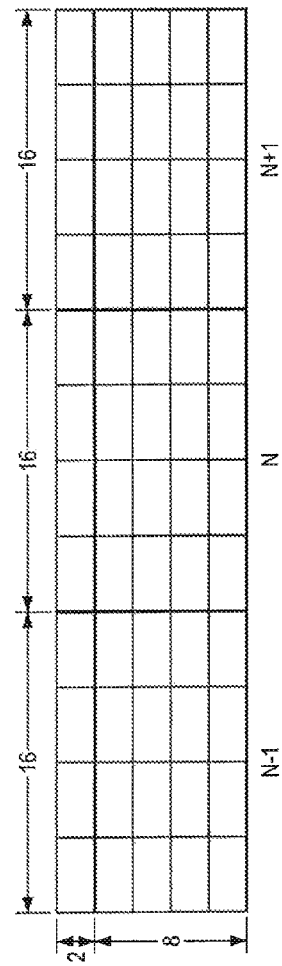

FIG. 8 shows a similar grid but for chrominance ("chroma") values. Filtering chroma values for a given macroblock requires only two rows of chroma values from an adjacent (e.g., top) macroblock in some embodiments.

Figure 9:
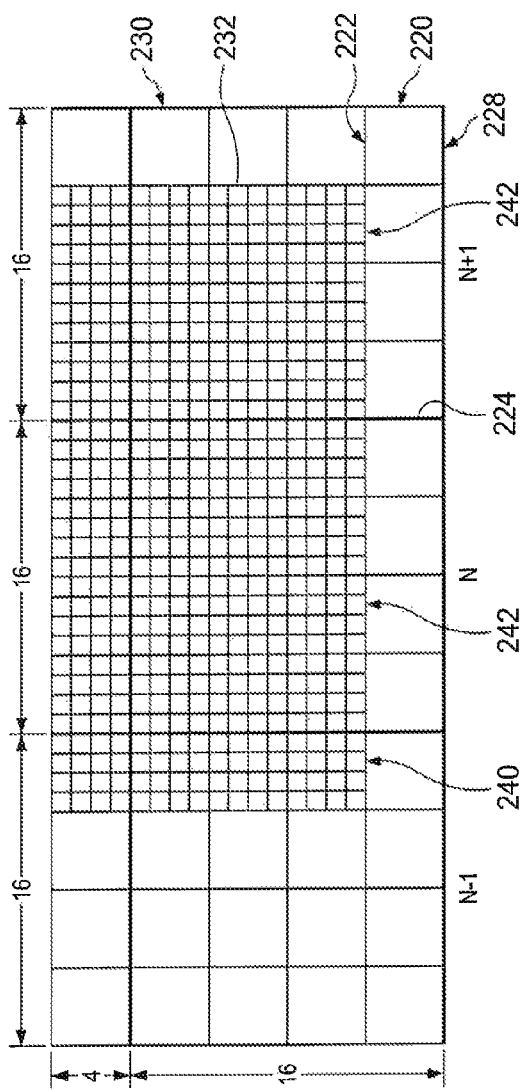
FIGS. 9 and 10 illustrate several macroblocks with partially filtered pixels.

FIG. 9 illustrates macroblock grids for luma values. The small squares represent fully filtered luma pixels. A fully filtered luma (or chroma for that matter) pixel is a pixel that has been both vertically and horizontally filtered through all stages of filtering. The bottom four rows 220 of pixels in the N−1, N, and N+1 macroblocks cannot be fully filtered at least because when the filtering process begins for the row of macroblocks below the N−1, N, and N+1 macroblocks, the filtering of the top four rows of pixels of such bottom macroblocks will change one or more of the pixels in the bottom four rows 220. The pixels in the bottom four rows 220 in macroblock N+1 may be partially filtered based on pixels about horizontal edge 222 but not about the bottom edge 228 of the macroblock because the block below that is not available for processing. Similarly, four columns of pixels to the left of the left edge 230 of macroblock N+1 may be partially filtered about vertical edge 232 but not about left edge 230 as the macroblock N+2 is not yet available processing. For macroblock N, only the bottom macroblock is unavailable (the right macroblock, macroblock N+1 is available) and thus only the bottom four rows of luma pixel values cannot be fully filtered.

All other pixels in macroblock N+1 are fully filtered as all necessary pixel data is available, either from within macroblock N+1 are left macroblock N or the top macroblock. Thus, in a 16×16 array of pixels of a macroblock, the top right 12×12 sub-array of pixels can be fully filtered by the remaining pixels in the macroblock due to the absences of necessary adjacent right or bottom macroblocks.

FIG. 9 illustrates that, when filtering macroblocks N and N+1, the 4×16 group of pixels 240 in the upper right corner of macroblock N−1 can be fully filtered (due to the presence of macroblock N), that the top 16×12 pixels 242 of macroblock N can be fully filtered (due to the presence of N's top macroblock, left macroblock N−1 and right macroblock N+1), and that only the top left 12×12 pixels 242 of macroblock N+1 can be fully filtered as explained above.

Figure 10:
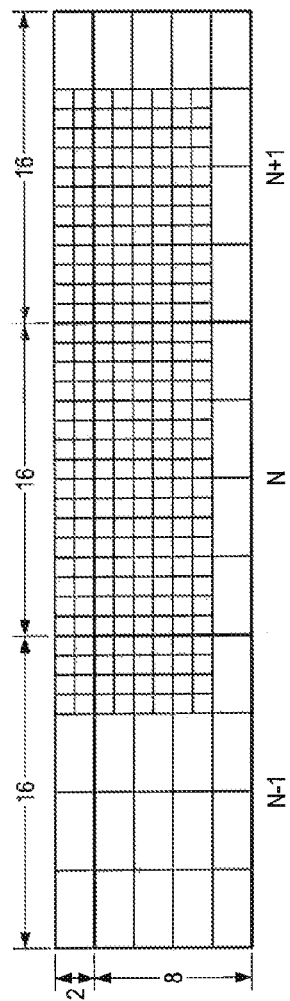

A similar analysis is possible for the chroma pixels depicted in FIG. 10. In FIG. 10, the small squares in macroblocks N and N+1 represent the chroma pixels that can be fully filtered due to the availability of all necessary pixel data while all other pixels cannot be fully filtered due to the unavailability of either or both of a bottom macroblock (in the case of N and N+1 macroblocks) or a right macroblock (in the case of the N+1 macroblock).

When a macroblock is filtered, the filtered macroblock is saved to external memory 91 via a DMA cycle. When filtering a given macroblock, however, only the fully filtered pixels are saved to external memory, not the partially filtered pixels. The partially filtered pixels are saved in one of the local buffers directly accessible to the loop filter 112. Such buffers include LPFWBUF0, LPFWBUF 1, LPFDBUF ping, and LPFDBUF pong (FIG. 2). The partially filtered luma and chroma values are distributed in a suitable fashion across any one or more of those four local buffers. The copy and write commands implemented by the loop filter 112 for this purpose may have two requirements which are met when saving partially filtered pixels. First, all copy and write commands may need to use source and destination addresses that are 16-byte aligned. Second, copying of data from one location in a buffer to another location in the same buffer may not be permitted (e.g., copying from one location in LPFWBUF0 to another location in LPFWBUF0 may be precluded). Instead, data may be copied from one buffer to a different buffer.

The partially filtered pixel data is saved to the local buffers and the full filtered pixel data is saved, using, for example, the DMA engine 80 to external memory 91. Then, when the previously saved partially filtered pixel data is needed for filtering an adjacent (e.g., right or bottom) macroblock and thus transitioned from partially filtered pixel data to fully filtered pixel data, such partially filtered pixel data may be copied to another one of the local buffers 109 and 128 for processing by loop filter 112. Then, when such pixel data becomes fully filtered, the fully filtered pixel data is saved to external memory (via DMA) along with the rest of the fully filtered pixel data of the corresponding macroblock to thereby assemble a fully filtered macroblock.

In the embodiments described herein, partially filtered pixel data is not saved to external memory. As such, partially filtered pixel data need not be written back into the local buffers 109, 128 for further filtering by loop filtering. Avoiding having to expend DMA cycles writing partially filtered pixel data back and forth between the loop filter's local buffers and external memory advantageously reduces the resource burden on the video encoder.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A video encoder, comprising:
   a loop filter to filter luminance ("luma") and chrominance ("chroma") pixel values;
   first and second loop filter working buffers accessible to the loop filter; and
   ping and pong loop filter data buffers accessible to the loop filter and to a direct memory access (DMA) engine;
   wherein the loop filter filters pixels about a plurality of vertical edges and a plurality of horizontal edges for each macroblock in a video frame and wherein the loop filter distributes partially filtered luma and chroma pixel values across the first and second loop filter working buffers as well as the ping and pong loop filter data buffers, and does not save partially filtered luma and chroma pixel values to external memory via the DMA engine and saves only fully filtered luma and chroma pixel to external memory via the DMA engine.

2. The video encoder of claim 1 wherein the first and second loop filter working buffers are accessible only to the loop filter.

3. A system, comprising:
   a video encoder comprising a loop filter to filter luminance ("luma") and chrominance ("chroma") pixel values, first and second loop filter working buffers accessible to the loop filter, and ping and pang loop filter data buffers accessible to the loop filter;
   memory external to the video encoder; and
   a direct memory access (DMA) engine configured to access the ping and pang loop filter data buffers and the memory;
   wherein the loop filter filters pixels about a plurality of vertical edges and a plurality of horizontal edges for each macroblock in a video frame and wherein the loop filter distributes partially filtered luma and chroma pixel values across the first and second loop filter working buffers as well as the ping and pong loop filter data buffers, and does not save partially filtered luma and chroma pixel values to the memory via the DMA engine and saves only fully filtered luma and chroma pixel to external memory via the DMA engine.

4. The system of claim 3 wherein the first and second loop filter working buffers are accessible only to the loop filter.

5. A method, comprising:
   filtering, by a loop filter, pixels in a macroblock of video data across a plurality of vertical edges associated with the macroblock;

filtering, by the loop filter, pixels in the macroblock across a plurality of horizontal edges associated with the macroblock;

saving partially filtered pixel data to first and second loop filter working buffers and to ping and pong loop filter data buffers accessible to the loop filter; and saving fully filtered, but not partially filtered, pixel data to memory using a direct memory access (DMA) engine.

6. The method of claim 5 wherein saving the partially filtered pixel data to the first and second loop filter working buffers comprises saving partially filtered pixel data to first and second loop filter working buffers that are accessible only to the loop filter.

\* \* \* \* \*